April 8, 1952   H. WEBER   2,592,361
REMOTE CONTROL DEVICE FOR HEATERS, VALVES, AND
OTHER REMOTE CONTROLLED PARTS
Filed Oct. 26, 1950
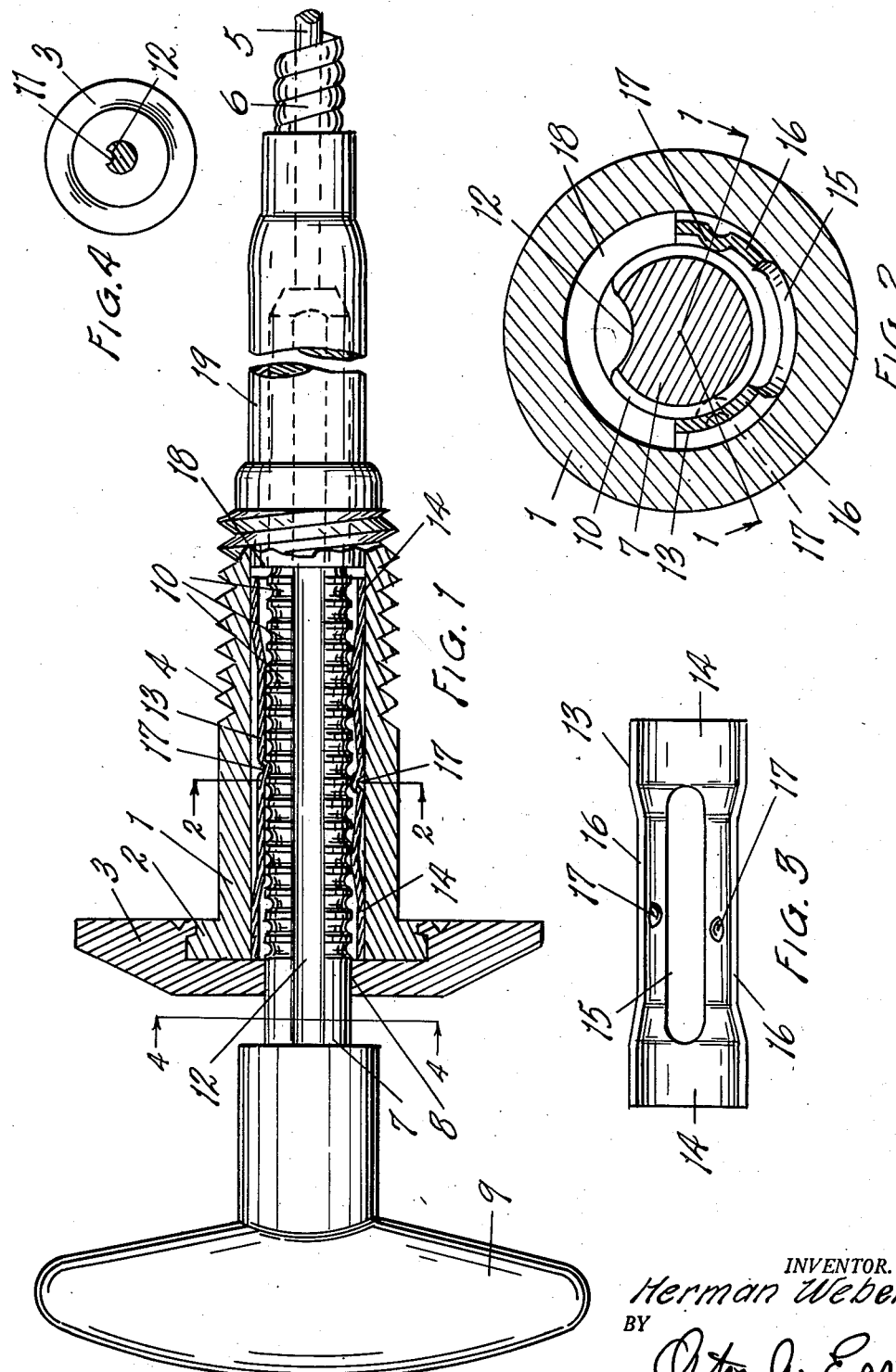
INVENTOR.
Herman Weber
BY
Otto A. Earl
Attorney Patented Apr. 8, 1952

2,592,361

UNITED STATES PATENT OFFICE 2,592,361

REMOTE CONTROL DEVICE FOR HEATERS, VALVES, AND OTHER REMOTE CONTROLLED PARTS

Herman Weber, Kalamazoo, Mich., assignor to Shakespeare Products Company, Kalamazoo, Mich.

Application October 26, 1950, Serial No. 192,281

2 Claims. (Cl. 74—503)

This invention relates to improvements in remote control devices for heaters, valves and other remote controlled parts.

The main objects of this invention are:

First, to provide a control device which is capable of quite fine adjustment and is well adapted for use in controlling heater parts, valves and other remote controlled parts.

Second, to provide a control device in which there are few parts and the parts are economical to produce and easily assembled.

Further objects relating to details and economies of the invention will appear from the description to follow. The invention is defined and pointed out in the claims.

A preferred embodiment of the invention is illustrated in the accompanying drawing, in which:

Fig. 1 is a fragmentary view of a remote control device embodying my invention partially in longitudinal section on a line corresponding to the broken line 1—1 of Fig. 2.

Fig. 2 is an enlarged transverse section on a line corresponding to line 2—2 of Fig. 1.

Fig. 3 is a plan view of the detent member.

Fig. 4 is a cross sectional view on a line corresponding to line 4—4 of Fig. 1.

The embodiment of my invention illustrated is adapted to be mounted on an instrument board or panel of a motor vehicle or other support and comprises a tubular support member 1 provided with a flange 2 at its forward end on which the escutcheon 3 is mounted. The support 1 has external threads 4 adapted to receive a clamping nut, not illustrated. The actuated or transmission rod 5 is adapted to be connected to the part to be controlled and is provided with a spiral sheath 6.

The rod-like adjusting member 7 extends forward through an opening 8 provided therefore in the escutcheon member and is provided with a grip or handle 9 at its forward end. The adjusting member has a series of peripheral grooves 10 providing keepers adapted to coact with coacting detents to be described. The escutcheon member is provided with a lug 11 coacting with the longitudinal groove 12 in the adjusting member to prevent rotating movement of the adjusting member. The rear end of the adjusting member is connected to the transmission or control member 5, details of the connection not being illustrated. The adjusting member is retained in its adjusted positions by means of the detent member designated generally by the numeral 13 which is formed as a sheet metal stamping of springable material and is provided with segmental end portions 14 for springable fit within the support member.

The detent member has a longitudinal slot 15 therein between the supporting end portions 14 and has inwardly offset springable detents 16 at each side of the slot. These detents are provided with keeper engaging lugs 17 desirably spherically curved and embossed therein as illustrated. The lugs are adapted to coact with the keepers and are longitudinally spaced relative to each other so that they alternately engage a keeper of the adjusting member as is clearly illustrated in Fig. 1. This provides for quite fine adjustment of the adjusting member. The parts are simple and economical to produce and very easily assembled. The detent member requires no support other than its expansive engagement within the support member, its longitudinal movement being limited by the escutcheon member and by the shoulder 18 provided by the forward end of the extension portion 19 of the support.

The structure illustrated is especially designed for controlling or adjusting parts which are not subjected to heavy load. However, where it is desired to use a control for regulating a device that may be subjected to considerable stress, the shape of the keepers and of the keeper engaging lugs or elements of the detent may be modified to provide for less easily releasable engagement. It is believed, however, that such a modification or adaptation will be readily understood by those skilled in the art and therefore it is not illustrated herein.

Having thus described my invention, what I claim as new and desire to secure by Letters Patent is:

1. In a control device the combination of an elongated tubular support, an adjusting rod longitudinally slidable within said support to project therefrom and having a grip on its projecting end, said adjusting rod having a longitudinal groove therein and said support having a lug coacting with said groove to prevent rotative movement of the adjusting rod with the support, said adjusting rod having a series of peripheral grooves of curved section providing a series of closely spaced keepers, an elongated transversely curved springable detent member unconnectedly disposed in said support to receive said adjusting rod, said member having its longitudinal mid portion offset radially inwardly and slotted longitudinally to form longitudinally extending springable keeper engaging detents provided with curved keeper engaging lugs, said lugs being longitudinally spaced relative to each other so that they alternately engage a keeper as the adjusting rod is longitudinally adjusted, and means on each end of said support projecting partially over the ends thereof to retain said detent member within said support.

2. In a control device the combination of an elongated tubular support, an adjusting rod longitudinally slidable within said support to project therefrom and having a grip on its projecting end, said adjusting rod having a series of peripheral grooves of curved section providing a series of closely spaced keepers, an elongated transversely curved springable detent member unconnectedly disposed in said support to receive said adjusting rod, said member having its longitudinal mid portion offset radially inwardly and slotted longitudinally to form longitudinally extending springable keeper engaging detents provided with curved keeper engaging lugs, said lugs being longitudinally spaced relative to each other so that they alternately engage a keeper as the adjusting rod is longitudinally adjusted, and means on each end of said support projecting partially over the ends thereof to retain said detent member within said support.

HERMAN WEBER.

REFERENCES CITED

The following references are of record in the file of this patent:

UNITED STATES PATENTS

| Number | Name | Date |
| --- | --- | --- |
| 1,339,811 | Dobrick | May 11, 1920 |
| 1,579,234 | Newman | Apr. 6, 1926 |
| 1,648,524 | Winning | Nov. 8, 1927 |
| 1,750,697 | Weatherhead, Jr. | Mar. 18, 1930 |
| 2,377,691 | Jandus | June 5, 1945 |

FOREIGN PATENTS

| Number | Country | Date |
| --- | --- | --- |
| 825,932 | France | Mar. 17, 1938 |